(12) United States Patent
Wang et al.

(10) Patent No.: US 7,929,155 B2
(45) Date of Patent: Apr. 19, 2011

(54) SYSTEM AND METHOD FOR ON-MACHINE 3-D DEPTH MEASUREMENT

(75) Inventors: Shih-Ming Wang, Tao-Yuan (TW); Han-Jen Yu, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 301 days.

(21) Appl. No.: 12/204,984

(22) Filed: Sep. 5, 2008

(65) Prior Publication Data

US 2010/0060907 A1 Mar. 11, 2010

(51) Int. Cl.
*G01B 11/00* (2006.01)
(52) U.S. Cl. ........................................ 356/626
(58) Field of Classification Search .................. None
See application file for complete search history.

(56) References Cited

U.S. PATENT DOCUMENTS

| 6,039,518 A * | 3/2000 | Day | 409/218 |
| 7,684,057 B2 * | 3/2010 | Sakai | 356/614 |

* cited by examiner

*Primary Examiner* — Tu T Nguyen
(74) *Attorney, Agent, or Firm* — WPAT., P.C.; Justin King

(57) ABSTRACT

The present invention provides a method and system for on-machine 3-D depth measurement. The same image retrieving apparatus measures the first distance for the width of the similar gray-level region of cutting-surface from the first angle, and measures the second distance for the width of the similar gray-level region of cutting-surface from the first angle superimposing the second angle. The width of the similar gray-level region of cutting-surface comprises the cutting-surface and the shadow of the bottom portion of the cutting-surface. And then the cutting-surface depth is calculated according to the first angle, the second angle, the first distance, and the second distance.

18 Claims, 6 Drawing Sheets

SYSTEM AND METHOD FOR ON-MACHINE 3-D DEPTH MEASUREMENT

BACKGROUND OF THE INVENTION

1. Field of the Invention

The present invention generally relates to system and method for the on-machine 3-D depth measurement.

2. Description of the Prior Art

With the development of the high technology and high precision industries, the size of parts has become smaller and smaller, and accuracy has also become much finer. In order to further enhance the accuracy of micro manufacture, an adequate error measurement method that can identify the milling errors of micro workpiece is necessary. However, because of the tighter accuracy requirement, miniaturized size of machined workpiece, and higher efficiency of manufacture, the measurement method should contain the characteristic of non-contact, real time, and on-machine.

The 3-D formation modeling in the mechanical vision field, as shown in FIG. 1, employs the concept that two parallel cameras, in a relative distance b (baseline distance), take pictures respectively, the coordinates Pl, Pr in the planes of the right and left image are obtained for the object point P, and value of Z is analyzed in the similar triangle theory:

$$z = \frac{bf}{|x'_l - x'_r|} \quad (1)$$

and $|x'_l - x'_r|$: the parallax of the same object point in two images
f: the focus of the camera Because the size of a camera is fixed, the visual field is smaller when the resolution is higher for the camera set sold in the current market if the 3-D formation theory is employed to calculate the depth of a micro device. To work in the image retrieving condition for a high resolution, the relative distance B cannot be too long because of the limitation of the scope of the visual field. That factor further affects the precision of the depth-pixel resolution (the object depth per pixel parallax unit) when measuring, because the parallax is too small. Therefore, the depth value cannot be calculated precisely so as not to meet the requirement of the depth measurement of the high-precision micro device usually because of the insufficient depth-pixel resolution, if the general camera set adopting the 3-D formation theory is employed to calculate the depth of the micro device.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

Accordingly, the new depth measurement model is derived based on the theory that the object cutting-surface (i.e. the object depth) in an image varies with the different angles of image retrieving, adopting the geometry optics and trigonometric function, under the condition that the specification of the camera is fixed in the research. It is called the uni-camera rotation-type depth measurement model. The depth measurement model is not limited by the specification of the camera, and can improve the precision of the depth measurement.

An object of the present invention is to provide an on-machine 3-D depth measurement. The first distance is obtained by analyzing the depth projection for an cutting-surface from the first angle, and then the second angle is superimposed to the first angle to analyze the depth projection of the cutting-surface at the same position to obtain the second distance by the same image retrieving apparatus. The depth projection of the cutting-surface comprises the projection of the cutting-surface itself and the projection of the shadow caused by the oblique light. Next, the depth of the cutting-surface is calculated according to the first angle, the second angle, the first distance, and the second distance. Besides, the first angle and the first angle superimposing the second angle are not zero.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
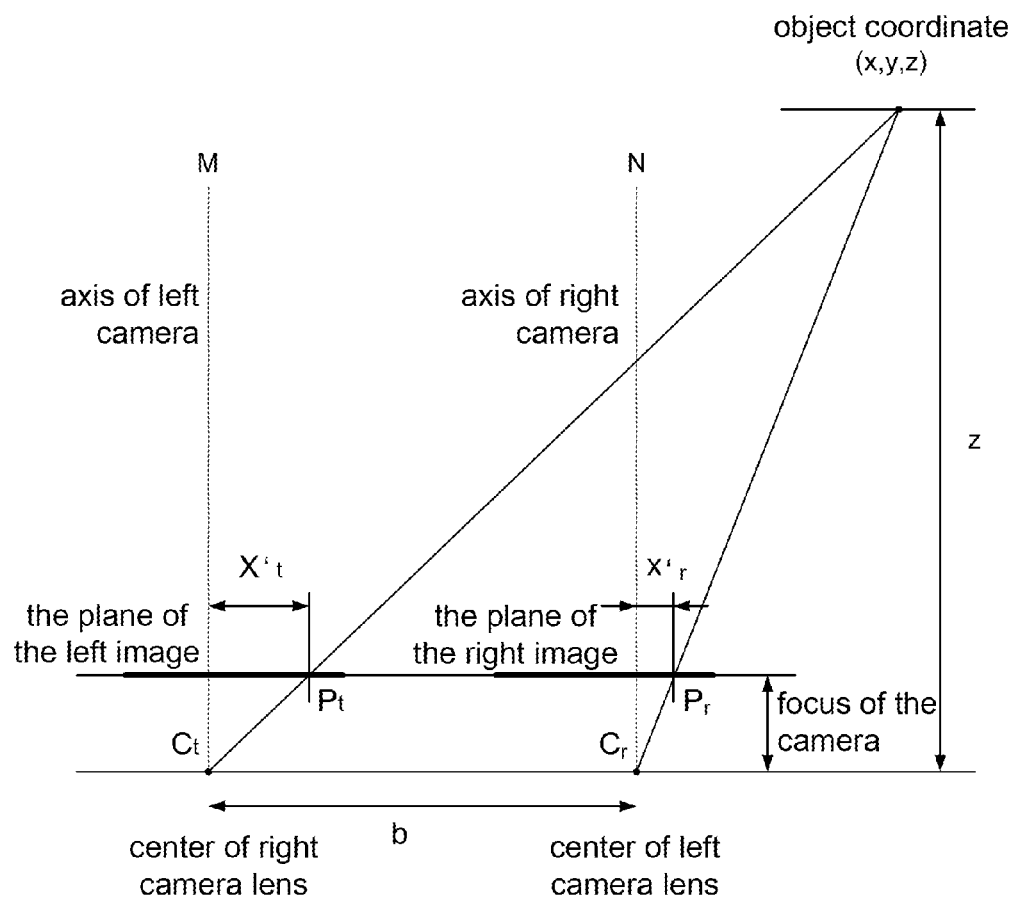
FIG. 1 is a diagram of the 3-D formation model of the prior art.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Figure 2A:
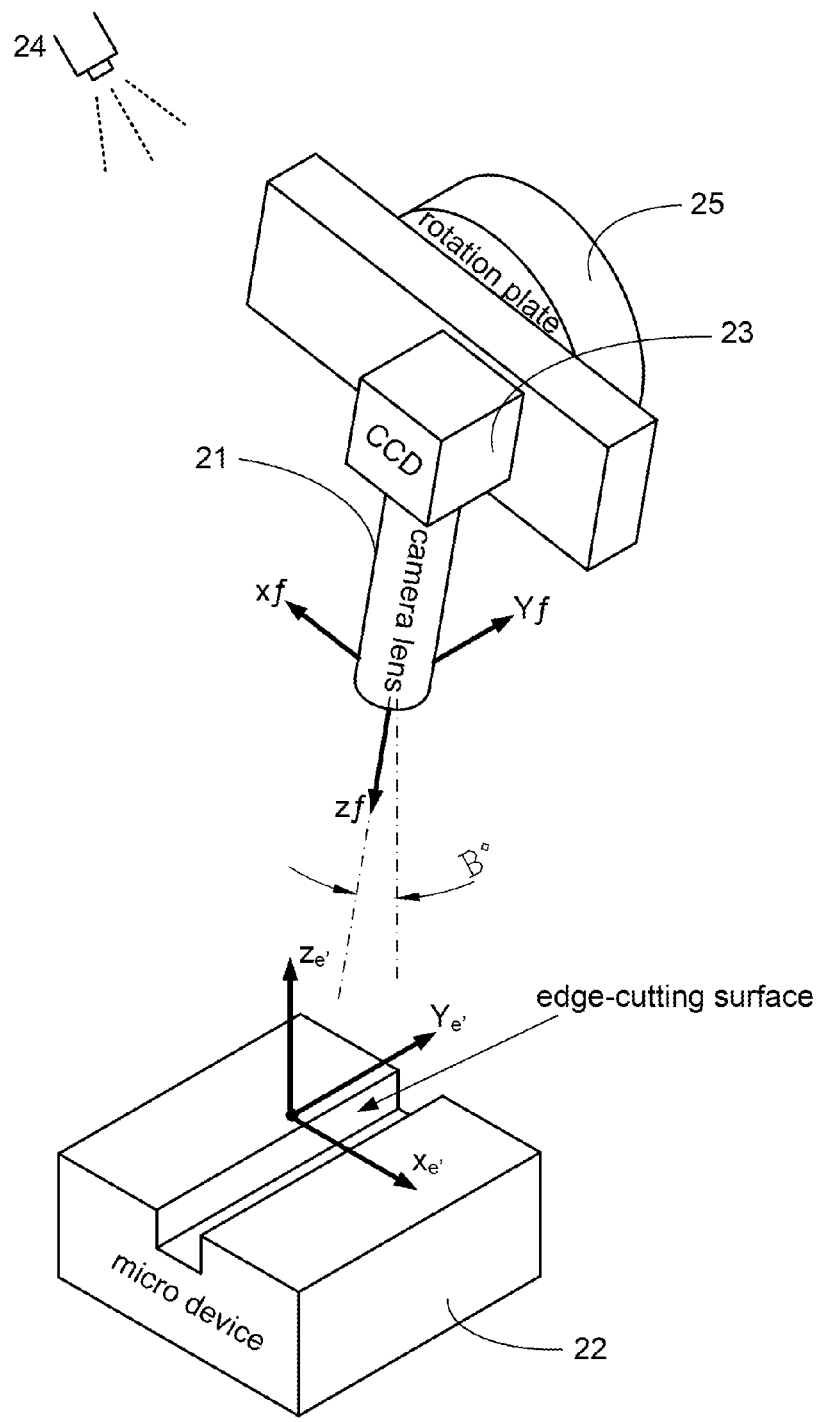
FIG. 2A is the lateral view diagram of the uni-camera rotation-type depth calculation model coordinate system of the present invention.
Figure 2B:
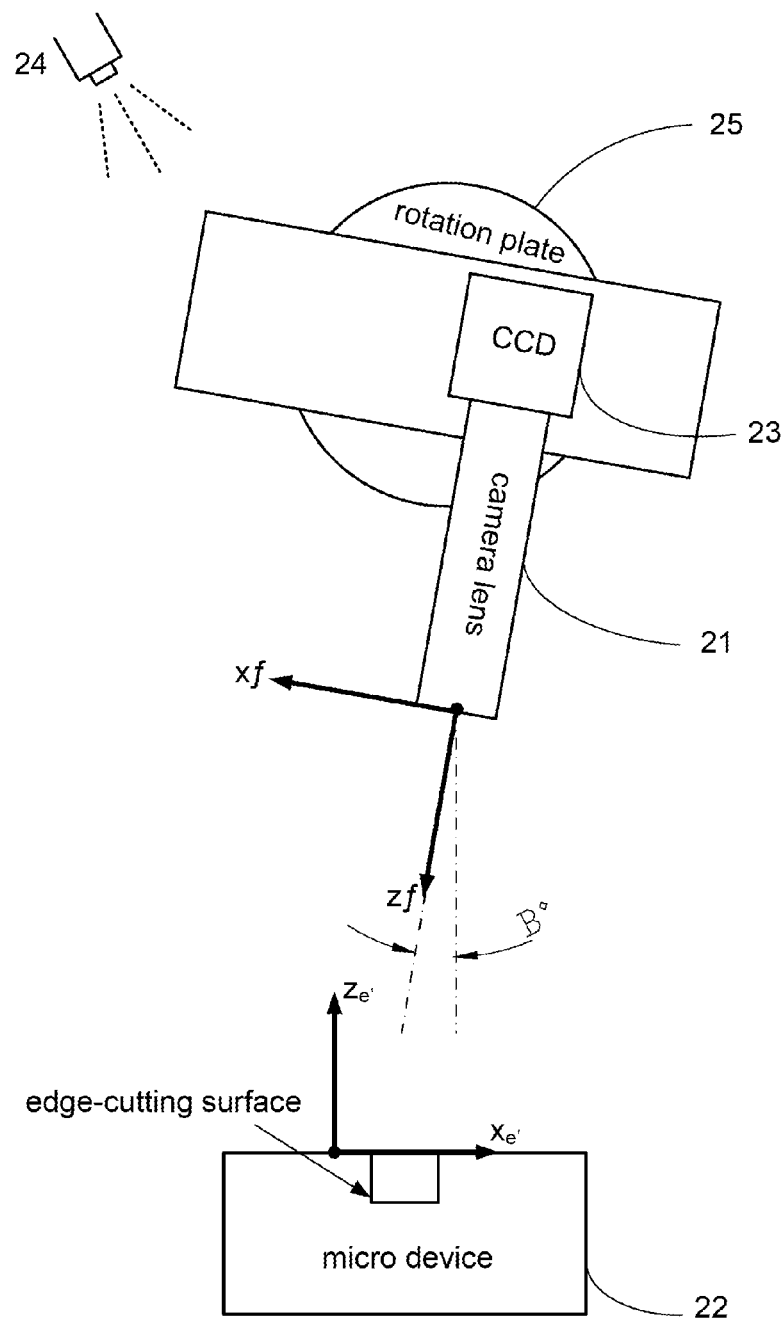
FIG. 2B is the front view diagram of the uni-camera rotation-type depth calculation model coordinate system of the present invention.
Figure 3:
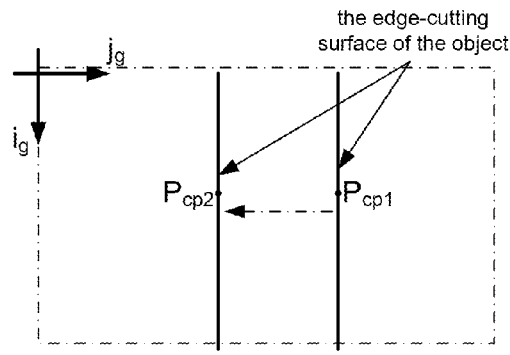
FIG. 3 is the diagram of the top and bottom boundaries of the cutting-surface of the present invention.

The diagram illustrating the setting-up and coordinate system of the uni-camera rotation-type depth measurement model is shown as FIGS. 2A and 2B. At first, the new object reference coordinate system $(x, y, z)^{e'}$ is set up on the top boundary of the cutting-surface which is required to be measured. The definition of the $y_{e'}$ and the perpendicular coordinate system of the $x_f$-$z_f$ plane of the camera coordinate system $(x, y, z)^f$ are shown as FIGS. 2A and 2B. After the definition of the coordinate system meets the requirement mentioned above, the cutting-surface in the image is the similar gray-level region when the camera is rotated around the yf axis by B degrees to take the picture of the cutting-surface. In the research, the width of the similar gray-level is employed for the calculation of the cutting depth measurement of the object. In the research, to obtain the width of the region, Canny edge detection method is employed to analyze the top and bottom boundaries of the cutting-surface in the image. The width, $\overline{P_{CP1}P_{CP2}}$ (pixel), projecting on the $j_g$ axis, of the boundary of the cutting-surface in the image is obtained by the upward-searching along the $j_g$ axis in the pixel coordinate system $(i, j)^g$.

The line $\overline{P_{CP1}P_{CP2}}$ is converted from the unit in a pixel to the unit in length according to the resolution of the image when the picture is taken. It is the projection of the cutting-surface in the space. The lateral cross-section of the line on the object is shown as FIG. 4A. The line $\overline{P_{CP1}P_{CP2}}$ is show as the solid blue line in the figure. In the research, the line is defined as the width of the similar gray-level region of cutting-surface.

Figure 4A:
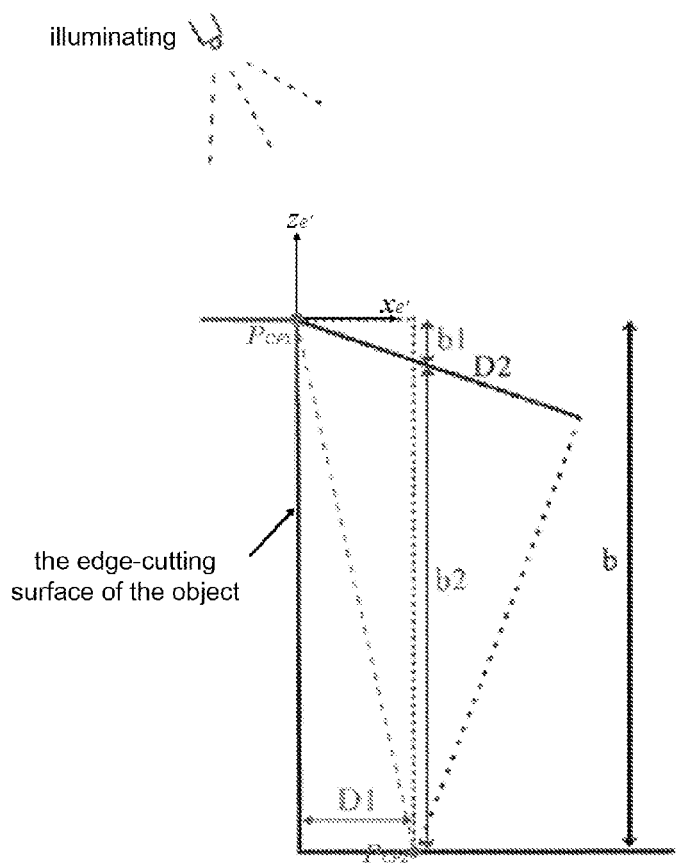
FIG. 4A is the diagram of the projection from the angle B1.
Figure 4B:
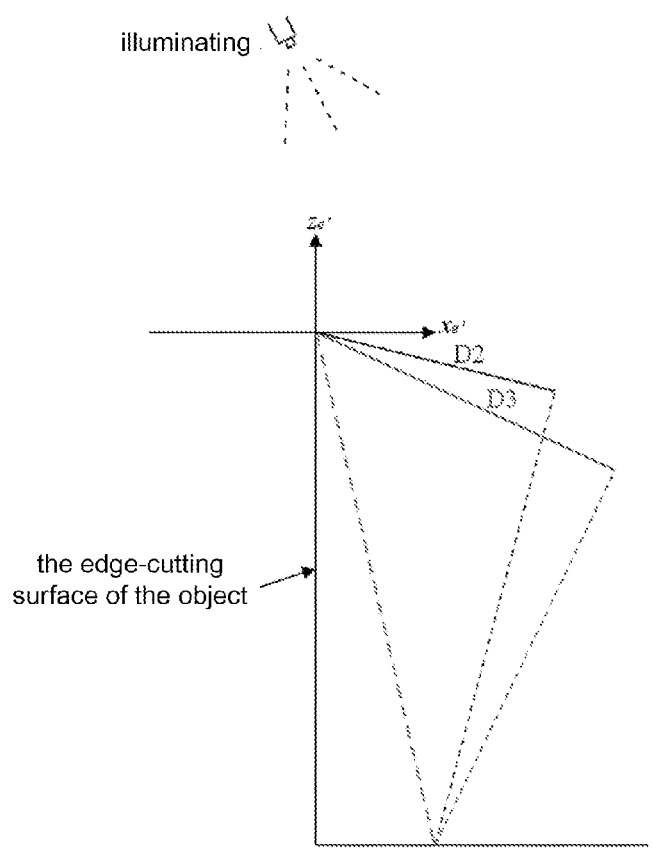
FIG. 4B is the diagram of the widths of the similar gray-level region of cutting-surfaces from different angles according to the present invention.

When the rotation degree of the camera is B1 for taking a picture, the relevant projection diagram is shown as FIG. 4A. When illuminating, the light source usually cannot be employed as the straight light source because of the reflection characteristic of the manufacturing material. But if the oblique light source is employed, a shadow (as shown in FIG. 4A, the solid red line D1) is formed because of the affection of the position of the light source that causes the top portion (as shown in FIG. 4A, point $P_{CP1}$) of the cutting-surface to project toward the bottom portion (as shown in FIG. 4A, point $P_{CP1}$) of the cutting-surface. The circumstance causes the misjudgment of the depth measurement because of the shadow of the projection when the determining the width of the similar gray-level region of cutting-surface. In the research, two sets of width of the similar gray-level region of cutting-surface (D2 and D3) (as shown in FIG. 4B) are obtained by adopting the two-step rotation measurement method (the rotation degrees are B1, (B1+B2)), and the precise object depth is obtained by canceling the effect of parameter D1 by deriving from the formula.

Considering the geometry relation, when the rotation degree in the object reference coordinate system for the camera is B1, the object depth b is:

$$b = D1 \times \tan(B1) + \frac{D2 - \frac{D1}{\cos(B1)}}{\sin(B1)} \quad (2)$$

and
b: depth of the object
D1: the width of the shadow caused by the oblique light
D2: the width of the similar gray-level region of cutting-surface from the retrieving angle B1 degree, when $B1 \neq 0°$ When the rotation degree in the object reference coordinate system for the camera is (B1+B2), the object depth b is:

$$b = D1 \times \tan(B1 + B2) + \frac{D3 - \frac{D1}{\cos(B1 + B2)}}{\sin(B1 + B2)} \quad (3)$$

Where D3: the width of the similar gray-level region of cutting-surface from the retrieving angle (B1+B2) degree, when $(B1+B2) \neq 0°$ D1 can be obtained by resolving the formulas (2) and (3). D1 is retrieved back to (2) or (3) to obtain the object depth. The formulas for b and D1 are:

$$D1 = \csc(B2) \times (D2 \times \sin(B1+B2) - D3 \times \sin(B1)) \quad (4)$$

$$b = (D3 \times \cos(B1) - D2 \times \cos(B1+B2)) \times \csc(B2) \quad (5)$$

According to the mentioned above, it is necessary to take pictures from two different angles (B1 and (B1+B2)) when performing the depth measurement in two-step rotation measurement method. The widths (D2 and D3) of the similar gray-level region of cutting-surfaces for different angles are retrieved back to formula (5), and then the depth of the object can be analyzed fast on machine.

Figure 5:
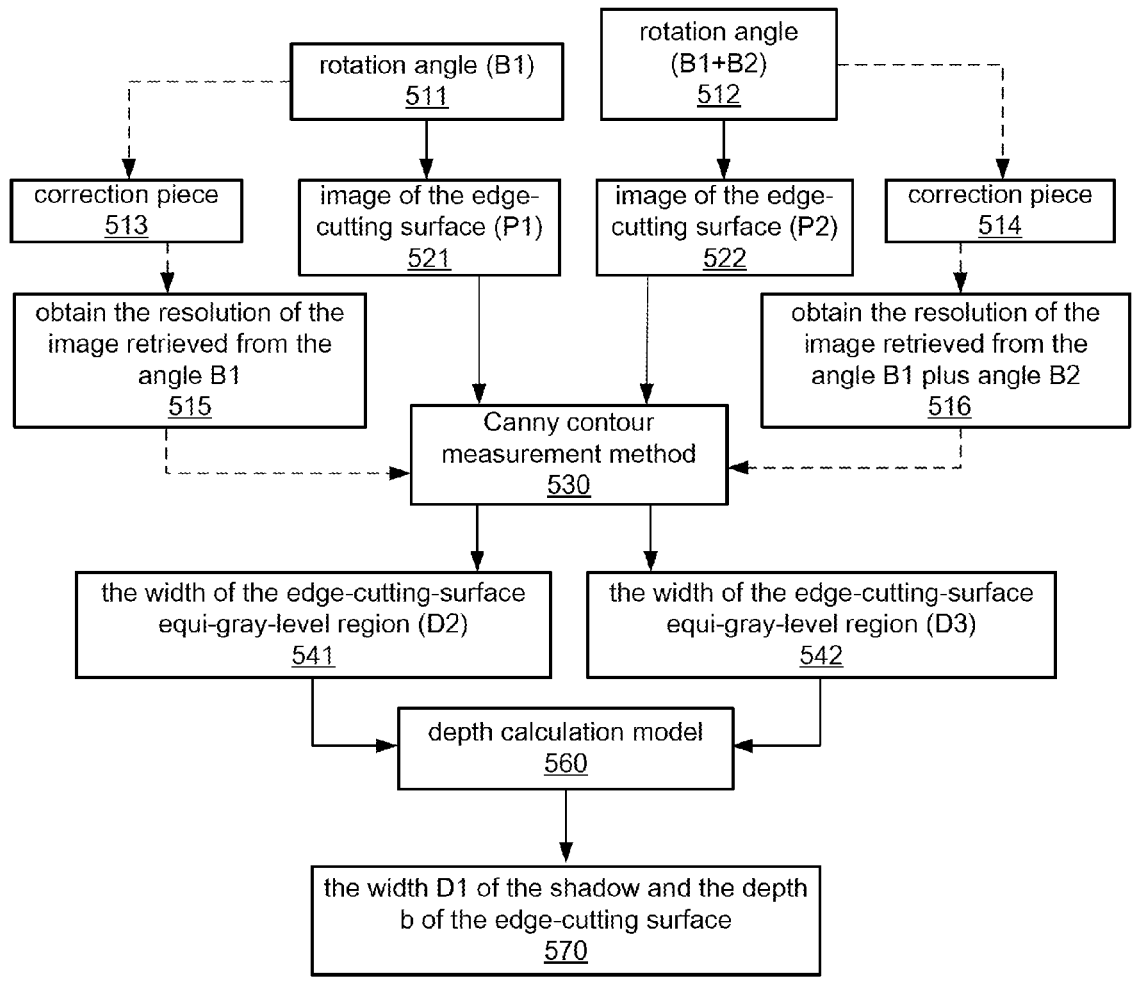
FIG. 5 is the measurement flowchart of the uni-camera rotation-type depth calculation model of the present invention.

FIG. 5 is the measurement flowchart for uni-camera rotation-type depth calculation model. As shown at step 511 and 521, an image retrieving apparatus retrieves the first-angle image of the cutting-surface from the first angle B1. And as shown as step at 512 and 522, the image retrieving apparatus retrieves the second-angle image of the cutting-surface from the first angle B1 plus the second angle B2.

Next, as shown at step 530, the contours for the widths of the similar gray-level region of cutting-surfaces in the first-angle image and second-angle image are analyzed respectively in the contour measurement method. In an embodiment of the present invention, the contour measurement method may be Canny edge detection method. A person skilled in the art can understand the other contour measurement methods can be employed for the present invention. There is no need to discuss the detail. In the meantime, as shown at step 513 and 515, the correction piece is employed to obtain the resolution of the image retrieved from the angle B1. As show at step 514 and 516, the correction piece is employed to obtain the resolution of the image retrieved from the angle B1 plus angle B2.

Next, as show at step 541 and 542, the retrieved contour images in the first-angle image and second-angle image according to the contour measurement method mentioned above turn out to be the first image (the width of the similar gray-level region of cutting-surface, D2) and the second image (the width of the similar gray-level region of cutting-surface, D3).

Next, as shown at step 560 and 570, the formulas of the uni-camera rotation-type depth calculation model (as the mentioned formula (2) and (3)) are calculated according to the first angle, the second angle, the first image, and the second image. And then the depth b of the cutting-surface and the width D1 of the shadow of the bottom part of the cutting-surface.

Accordingly, an embodiment of the present invention, a method for on-machine 3-D depth measurement, is shown as FIG. 6. At first, as shown at step 610, the first distance for a width of an similar gray-level region of cutting-surface is measured from a first angle, and the width of the similar gray-level region of cutting-surface comprises a shadow of the cutting-surface and a bottom portion of the cutting-surface. Next, as shown at step 620, the second distance for the width of the similar gray-level region of cutting-surface is measured from the first angle plus the second angle. At last, as shown at step 630, the depth of the cutting-surface is calculated according to the first angle, the second angle, the first distance, and the second distance. Besides, the first angle plus the second angle is not zero. In addition, the width of the similar gray-level region of cutting-surface is the projection of the height of the cutting-surface illuminated by a light source above the cutting-surface.

In an embodiment of the present invention, the first distance is a distance from a top portion of the cutting-surface to an end of a shadow of the bottom portion of the cutting-surface when measuring the first distance for the width of the similar gray-level region of cutting-surface from the first angle. For example, the first image of the cutting-surface is retrieved from the first angle by an image retrieving apparatus, and the first distance is a distance from the top portion of the cutting-surface to the end of the shadow of the bottom portion of the cutting-surface in the first image. Similarly, the second distance is a distance from a top portion of the cutting-surface to an end of a shadow of the bottom portion of the cutting-surface when measuring the second distance for the width of the similar gray-level region of cutting-surface from the first angle superimposing a second angle. For example, the second image of the cutting-surface is retrieved from the first angle superimposing the second angle by the image retrieving apparatus, and the first distance is a distance from the top portion of the cutting-surface to the end of the shadow of the bottom portion of the cutting-surface in the second image. In an embodiment of the present invention, the first image and the second image are retrieved by the same image retrieving apparatus. A person skilled in the art can understand that the first image and the second image can be retrieved by different image retrieving apparatuses.

Besides, the cutting-surface depth, the width of the similar gray-level region of cutting-surface of the shadow of the bottom portion of the cutting-surface, the first angle, the second angle, the first distance, and the second distance are b, D1, D2, D3, B1, and B2 respectively, and b=(D3×cos(B1)−D2×cos(B1+B2))×csc(B2), and D1=csc(B2)×(D2×sin(B1+B2)−D3×sin(B1)).

An embodiment of the present invention is a system for on-machine 3-D depth measurement, comprising an object 22, a light source 24, an image retrieving apparatus 21, an image measurement apparatus 23, and a rotation plate 25, as shown in FIGS. 2A, 2B, 4A, and 4B. There is an cutting-surface on the object 22. The light source 24 is above the cutting-surface, and illuminates on the cutting-surface to generate a width of the similar gray-level region of cutting-surface. The rotation plate is above the object 22. The image retrieving apparatus 21 is on the rotation plate 25. The image retrieving apparatus 21 points to the object 22 from the first angle and the first angle superimposing the second angle respectively when the rotation plate is rotated to a first position and a second position. The image retrieving apparatus 21 retrieves the first image and the second image from the first angle and the first angle plus the second angle respectively. The image measurement apparatus 23 measures the first distance and the second distance of the width of the cutting-surface similar gray-level region for the first image and the second image, and calculates an cutting-surface depth according to the first angle, the second angle, the first distance, and the second distance. The other detail of the embodiment has been disclosed in the description above. There is no need to repeat.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A method for on-machine 3-D depth measurement, comprising:
    measuring a first distance of a width of an similar gray-level region of cutting-surface from a first angle, wherein the width of the similar gray-level region of cutting-surface comprises a shadow of the cutting-surface and a bottom portion of the cutting-surface;
    measuring a second distance of the width of the similar gray-level region of cutting-surface from the first angle superimposing a second angle;
    using an image measuring apparatus for calculating an cutting-surface depth according to the first angle, the second angle, the first distance, and the second distance.

2. The method for on-machine 3-D depth measurement according to claim 1, wherein the first distance is a distance from a top portion of the cutting-surface to an end of a shadow of the bottom portion of the cutting-surface when measuring the first distance for the width of the similar gray-level region of cutting-surface from the first angle.

3. The method for on-machine 3-D depth measurement according to claim 1, wherein the second distance is a distance from a top portion of the cutting-surface to an end of a shadow of the bottom portion of the cutting-surface when measuring a second distance for the width of the similar gray-level region of cutting-surface from the first angle superimposing a second angle.

4. The method for on-machine 3-D depth measurement according to claim 3, wherein the cutting-surface depth, the width of the similar gray-level region of cutting-surface of the shadow of the bottom portion of the cutting-surface, the first angle, the second angle, the first distance, and the second distance are b, D1, D2, D3, B1, and B2 respectively, and $$D1=csc(B2)\times(D2\times sin(B1+B2)-D3\times sin(B1)).$$

5. The method for on-machine 3-D depth measurement according to claim 1, wherein the cutting-surface depth, the width of the similar gray-level region of cutting-surface of the shadow of the bottom portion of the cutting-surface, the first angle, the second angle, the first distance, and the second distance are b, D1, D2, D3, B1, and B2 respectively, and $$b=(D3\times cos(B1)-D2\times cos(B1+B2))\times csc(B2).$$

6. The method for on-machine 3-D depth measurement according to claim 1, wherein measuring the first distance is to retrieve a first image of the cutting-surface from the first angle by an image retrieving apparatus, and the first distance is a distance from the top portion of the cutting-surface to the end of the shadow of the bottom portion of the cutting-surface in the first image.

7. The method for on-machine 3-D depth measurement according to claim 6, wherein measuring the second distance is to retrieve a second image of the cutting-surface from the first angle superimposing the second angle by the image retrieving apparatus, and the first distance is a distance from the top portion of the cutting-surface to the end of the shadow of the bottom portion of the cutting-surface in the second image.

8. The method for on-machine 3-D depth measurement according to claim 6, wherein measuring the second distance is to retrieve a second image of the cutting-surface from the first angle superimposing the second angle by another image retrieving apparatus, and the first distance is a distance from the top portion of the cutting-surface to the end of the shadow of the bottom portion of the cutting-surface in the second image.

9. The method for on-machine 3-D depth measurement according to claim 6, wherein the first angle and the first angle superimposing the second angle are not zero.

10. The method for on-machine 3-D depth measurement according to claim 1, wherein the width of the similar gray-level region of cutting-surface is the projection of a light source illuminate on the cutting-surface and the light source is above the cutting-surface.

11. A system for on-machine 3-D depth measurement, comprising:
an object, comprising an cutting-surface;
a light source above the cutting-surface, illuminating on the cutting-surface to generate a width of an similar gray-level region of cutting-surface;
an image retrieving apparatus, retrieving a first image and a second image for the cutting-surface from a first angle and the first angle superimposing a second angle respectively; and
an image measurement apparatus, measuring a first distance and a second distance of the width of the cutting-surface similar gray-level region for the first image and the second image, and calculating an cutting-surface depth according to the first angle, the second angle, the first distance, and the second distance.

12. The system for on-machine 3-D depth measurement according to claim 11, wherein the first distance is a distance from a top portion of the cutting-surface to an end of a shadow of the bottom portion of the cutting-surface when the image measurement apparatus measures the first distance for the similar gray-level region of cutting-surface of the first image.

13. The system for on-machine 3-D depth measurement according to claim 11, wherein the second distance is a distance from a top portion of the cutting-surface to an end of a shadow of the bottom portion of the cutting-surface when the image measurement apparatus measures the first distance for the similar gray-level region of cutting-surface of the second image.

14. The method for on-machine 3-D depth measurement according to claim 11, wherein the cutting-surface depth, the width of the similar gray-level region of cutting-surface of the shadow of the bottom portion of the cutting-surface, the first angle, the second angle, the first distance, and the second distance are b, D1, D2, D3, B1, and B2 respectively, and $$b=(D3\times\cos(B1)-D2\times\cos(B1+B2))\times csc(B2).$$

15. The method for on-machine 3-D depth measurement according to claim 11, wherein the cutting-surface depth, the width of the similar gray-level region of cutting-surface of the shadow of the bottom portion of the cutting-surface, the first angle, the second angle, the first distance, and the second distance are b, D1, D2, D3, B1, and B2 respectively, and $$D1=csc(B2)\times(D2\times\sin(B1+B2)-D3\times\sin(B1)).$$

16. The method for on-machine 3-D depth measurement according to claim 11, wherein the first distance is a distance from the cutting-surface to an end of a shadow of the bottom portion of the cutting-surface in the first image.

17. The method for on-machine 3-D depth measurement according to claim 11, wherein the second distance is a distance from the cutting-surface to an end of a shadow of the bottom portion of the cutting-surface in the second image.

18. The method for on-machine 3-D depth measurement according to claim 11, further comprising a rotation plate locating above the object, wherein the image retrieving apparatus locates on the rotation plate, and points to the object from the first angle and the first angle superimposing the second angle respectively when the rotation plate is rotated to a first position and a second position.

* * * * *